US012592206B2

(12) United States Patent
Ban et al.

(10) Patent No.: US 12,592,206 B2
(45) Date of Patent: Mar. 31, 2026

(54) DISPLAY DEVICE

(71) Applicant: TCL CHINA STAR OPTOELECTRONICS TECHNOLOGY CO., LTD., Shenzhen (CN)

(72) Inventors: Youngil Ban, Huizhou (CN); Jinfeng Liu, Huizhou (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 124 days.

(21) Appl. No.: 18/260,001

(22) PCT Filed: Apr. 18, 2023

(86) PCT No.: PCT/CN2023/088952

§ 371 (c)(1),
(2) Date: Jun. 29, 2023

(87) PCT Pub. No.: WO2024/164430

PCT Pub. Date: Aug. 15, 2024

(65) Prior Publication Data

US 2024/0420658 A1 Dec. 19, 2024

(30) Foreign Application Priority Data

Feb. 9, 2023 (CN) ........................ 202310129209.7

(51) Int. Cl.
*G09G 3/36* (2006.01)

(52) U.S. Cl.
CPC ......... *G09G 3/3614* (2013.01); *G09G 3/3607* (2013.01); *G09G 3/3685* (2013.01);
(Continued)

(58) Field of Classification Search
CPC .. G09G 3/3614; G09G 3/3607; G09G 3/3685; G09G 2320/0209;
(Continued)

(56) References Cited

U.S. PATENT DOCUMENTS

2008/0158125 A1* 7/2008 Mori .................... G09G 3/3648 345/92
2015/0194119 A1* 7/2015 Ahn ..................... G09G 3/2025 345/82

(Continued)

FOREIGN PATENT DOCUMENTS

CN 104299552 A 1/2015
CN 108847194 A 11/2018

(Continued)

OTHER PUBLICATIONS

International Search Report in International application No. PCT/CN2023/088952, mailed on Nov. 6, 2023.

(Continued)

*Primary Examiner* — Priyank J Shah
(74) *Attorney, Agent, or Firm* — PV IP PC; Peter Stecher; Wei Te Chung

(57) ABSTRACT

The present application discloses a display device. The display device includes a display panel and a driving module. Each grayscale includes a positive polarity voltage and a negative polarity voltage symmetrical with respect to a common voltage. A data line is configured to output corresponding data voltages to each sub-pixel respectively. The driving module includes an adjustment unit. The adjustment unit is configured to increase the voltage values of the positive polarity voltages to obtain the compensated positive polarity voltages. The data voltages are the negative polarity voltages or the compensated positive polarity voltages.

17 Claims, 7 Drawing Sheets

(52) U.S. Cl.
CPC ... *G09G 2310/027* (2013.01); *G09G 2310/08* (2013.01); *G09G 2320/0209* (2013.01); *G09G 2320/0233* (2013.01); *G09G 2320/0247* (2013.01)

(58) Field of Classification Search
CPC ... G09G 2320/0233; G09G 2320/0247; G09G 2310/027
See application file for complete search history.

(56) References Cited

U.S. PATENT DOCUMENTS

| | | | | |
|---|---|---|---|---|
| 2017/0213501 | A1* | 7/2017 | Lim | G09G 3/3688 |
| 2020/0402446 | A1* | 12/2020 | Wang | G09G 3/3208 |
| 2023/0162649 | A1* | 5/2023 | Zhao | G09G 3/20 |
| 2023/0222988 | A1* | 7/2023 | Zhang | G09G 3/3696<br>345/96 |
| 2023/0335059 | A1* | 10/2023 | Mi | G09G 3/3233 |
| 2024/0071284 | A1* | 2/2024 | Meng | G09G 3/3233 |

FOREIGN PATENT DOCUMENTS

| | | | |
|---|---|---|---|
| CN | 109192170 | A | 1/2019 |
| CN | 110310609 | A | 10/2019 |
| CN | 112201212 | A | 1/2021 |
| CN | 112581919 | A | 3/2021 |
| CN | 113284470 | A | 8/2021 |
| CN | 115171617 | A | 10/2022 |
| CN | 115691381 | A | 2/2023 |
| KR | 20060021561 | A | 3/2006 |
| KR | 20080061035 | A | 7/2008 |
| KR | 20150029982 | A | 3/2015 |
| WO | 2022147953 | A1 | 7/2022 |

OTHER PUBLICATIONS

Written Opinion of the International Search Authority in International application No. PCT/CN2023/088952, mailed on Nov. 6, 2023.
Chinese Office Action issued in corresponding Chinese Patent Application No. 202310129209.7 dated Aug. 22, 2025, pp. 1-8.
Chinese Office Action issued in corresponding Chinese Patent Application No. 202310129209.7 dated Jan. 5, 2026, pp. 1-7.

* cited by examiner

| | Data Line 1 | Data Line 2 | Data Line 3 | Data Line 4 | Data Line 5 | Data Line 6 |
|---|---|---|---|---|---|---|
| Frame 1 | + (32+2) | − 32 | + (32+2) | − 32 | + (32+2) | − 32 |
| Frame 2 | − 32 | + (32+2) | − 32 | + (32+2) | − 32 | + (32+2) |
| Frame 3 | + (32+2) | − 32 | + (32+2) | − 32 | + (32+2) | − 32 |
| Frame 4 | − 32 | + (32+2) | − 32 | + (32+2) | − 32 | + (32+2) |
| Frame 5 | + (32+2) | − 32 | + (32+2) | − 32 | + (32+2) | − 32 |
| Frame 6 | − 32 | + (32+2) | − 32 | + (32+2) | − 32 | + (32+2) |
| Frame 7 | + (32+2) | − 32 | + (32+2) | − 32 | + (32+2) | − 32 |
| Frame 8 | − 32 | + (32+2) | − 32 | + (32+2) | − 32 | + (32+2) |
| Frame 9 | + (32+2) | − 32 | + (32+2) | − 32 | + (32+2) | − 32 |
| Frame 10 | − 32 | + (32+2) | − 32 | + (32+2) | − 32 | + (32+2) |

DISPLAY DEVICE

CROSS-REFERENCE TO RELATED APPLICATIONS

This application is a national stage of International Application No. PCT/CN2023/088952, filed on Apr. 18, 2023, which claims priority to Chinese Patent Application No. 202310129209.7, filed on Feb. 9, 2023. Both of the aforementioned applications are hereby incorporated by reference in their entireties.

TECHNICAL FIELD

The present application relates to the field of display technology, and in particular, to a display device.

BACKGROUND

With the continuous development of the display panel industry, display panels with special driving architectures (dual-gate driving architecture, tri-gate driving architecture, etc.), large size, high resolution and high refresh rate are increasingly favored by consumers. However, the development of the driving architecture, the increase in size, and the improvement in resolution and refresh rate in the display panel have brought the problem of insufficient charging rate. As shown in FIG. 1, due to the RC delay of the wiring, the waveforms of the scanning signals and the data signals are attenuated and distorted, and the waveforms of the scanning signals and the data signals at the position farthest from the voltage output end are severely distorted. For example, as shown in FIG. 1, the charging rate is the worst in the area "B".

In addition, in order to prevent polarization of the liquid crystal molecules, each grayscale corresponds to a positive polarity voltage and a negative polarity voltage, and the data voltages transmitted by the data lines switch between the positive polarity voltage and the negative polarity voltage. As shown in FIG. 2, the shaded area represents the effective charging time. It can be seen that due to waveform distortion caused by RC delay in the scanning signal, the effective charging time of the positive polarity voltage (SIC P) corresponding to a grayscale is less than the effective charging time of the negative polarity voltage (SIC N) corresponding to the same grayscale, thus affecting the display uniformity.

SUMMARY OF THE INVENTION

Technical Problem

The present application provides a display device to solve the technical problem that the effective charging time of the positive polarity voltage corresponding to a grayscale is less than the effective charging time of the negative polarity voltage corresponding to the same grayscale in the prior art, thereby affecting display uniformity.

Technical Solution

The present application provides a display device, comprising:

a display panel, the display panel comprises a plurality of data lines and a plurality of sub-pixels connected to the data lines; within a period of a frame of image, each sub-pixel corresponds to a grayscale for display, each grayscale comprises a positive polarity voltage and a negative polarity voltage symmetrical with respect to a common voltage, and the data lines are configured to output corresponding data voltages to each sub-pixel respectively; and a driving module connected to the display panel, the driving module is configured to output the data voltages to the data lines; the driving module comprises an adjustment unit, the adjustment unit is configured to increase the voltage values of the positive polarity voltages to obtain compensated positive polarity voltages;

wherein, the data voltages are the negative polarity voltages or the compensated positive polarity voltages.

Optionally, in some embodiments of the present application, the driving module comprises a timing control chip, and the adjustment unit is integrated in the timing control chip;

wherein, each grayscale comprises a positive polarity grayscale and a negative polarity grayscale, the positive polarity grayscale corresponds to the positive polarity voltage, the negative polarity grayscale corresponds to the negative polarity voltage, and the adjustment unit is configured to increase the grayscale values of the positive polarity grayscales of each frame of the image.

Optionally, in some embodiments of the present application, the timing control chip is further configured to set the polarity of the data voltages transmitted by each data line respectively in the first frame of image.

Optionally, in some embodiments of the present application, the driving module comprises a system chip, a timing control chip, and a source driving chip, the timing control chip is integrated in the system chip, and the adjustment unit is integrated in the source driving chip.

Optionally, in some embodiments of the present application, the source driving chip comprises a data memory, a latch, and a digital-to-analog converter arranged in sequence;

the adjustment unit is disposed between the data memory and the digital-to-analog converter or after the digital-to-analog converter, and the adjustment unit is configured to adjust the positive polarity voltages corresponding to a row of the sub-pixels each time.

Optionally, in some embodiments of the present application, the latches comprise a first latch and a second latch, the second latch is disposed between the first latch and the digital-to-analog converter, the second latch is configured to latch the data voltages corresponding to the present row of sub-pixels, and the first latch is configured to latch the data voltages corresponding to the next row of sub-pixels;

wherein the adjustment unit is disposed between the first latch and the second latch.

Optionally, in some embodiments of the present application, within a same frame period of an image, the polarities of the data voltages transmitted by every two adjacent data lines are opposite;

wherein, the plurality of the sub-pixels are arranged in an array pattern, and the polarities of the data voltages corresponding to each adjacent two of the sub-pixels are opposite, or the polarities of the data voltages corresponding to each adjacent two columns of the sub-pixels are opposite.

Optionally, in some embodiments of the present application, within frame periods of two adjacent images, the polarities of the data voltages transmitted by the same data line are opposite.

Optionally, in some embodiments of the present application, the driving module is further configured to determine, based on the monochrome image of the grayscale, an increase value of the positive polarity voltage corresponding to the grayscale.

Optionally, in some embodiments of the present application, the driving module further comprises a register configured to store the increase values of the positive polarity voltages corresponding to each grayscale respectively.

Optionally, in some embodiments of the present application, the grayscales comprise a first grayscale and a second grayscale, the first grayscale is greater than the second grayscale, and the increase value of the positive polarity voltage corresponding to the first grayscale is greater than the increase value of the positive polarity voltage corresponding to the second grayscale.

Optionally, in some embodiments of the present application, for the same grayscale, the compensated positive polarity voltage corresponding to a sub-pixel closer to the driving module is greater than the compensated positive polarity voltage corresponding to a sub-pixel farther from the driving module.

Advantageous Effects

The present application provides a display device. The driving module of the display device is provided with the adjustment unit. The adjustment unit is configured to increase the voltage values of the positive polarity voltages to obtain compensated positive polarity voltages. The data lines are configured to output corresponding negative polarity voltages or corresponding compensated positive polarity voltages to each sub-pixel respectively within a frame period of an image. Therefore, by increasing the voltage values of the positive polarity voltages in each frame of the image, and charging the corresponding sub-pixels with the compensated positive polarity voltages, the charging difference between the positive polarity voltage corresponding to a grayscale and the negative polarity voltage corresponding to the same grayscale can be reduced, and the charging uniformity of the display panel can be improved. In addition, since the negative polarity voltage corresponding to a grayscale and the compensated positive polarity voltage corresponding to the same grayscale are output simultaneously, the coupling effect on the common voltage can therefore counteract each other, improving the display effect without affecting the common voltage and avoiding other image quality problems such as crosstalk.

BRIEF DESCRIPTION OF THE DRAWINGS

In order to illustrate the technical solutions in the embodiments of the present application more clearly, a brief introduction to the drawings needed in the description of the embodiments will be provided below. It is evident that the drawings described below correspond only to some embodiments of the present application. For those skilled in the art, other drawings can be obtained based on these drawings without creative efforts.

DETAILED DESCRIPTION OF THE EMBODIMENTS

The following describes the technical solutions of the embodiments of the present application clearly and completely in conjunction with the drawings of the embodiments of the present application. Obviously, the described embodiments are only a part of embodiments of the present application and not all embodiments. Based on the embodiments of the present application, all other embodiments obtained by those skilled in the art without creative efforts are within the scope of the present application.

In the description of the present application, it should be understood that the terms "first" and "second" are used for description only and should not be understood as indicating or implying the relative importance of the technical features or implicitly indicating the number of the technical features. Accordingly, the technical features defined with "first" and "second" and so on may expressly or implicitly include one or more of the technical features, and therefore should not be understood as limitations to the present application. In addition, it should be noted that, unless otherwise expressly defined or limited, the terms "connection" should be broadly understood, for example, it can be understood as a mechanical connection or an electrical connection, it can be understood as a direct connection or an indirect connection through a medium, and it can be understood as an internal communication between two elements. For those skilled in the art, the specific meanings of the above terms in the present invention can be understood according to the specific circumstances.

The present application provides a display device, which will be described in detail below. It should be noted that the order of description of the following embodiments does not define the preferred order of the embodiments of the present application.

Figure 3:
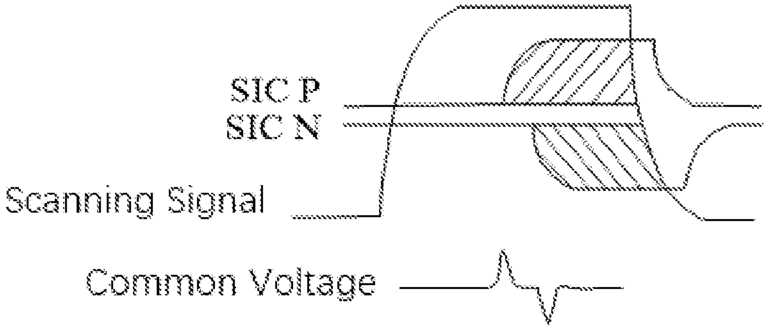
FIG. 3 is a schematic diagram of a second charging rate of sub-pixels provided in the present application.

Refer to FIG. 3. FIG. 3 is a schematic diagram of a second charging rate of sub-pixels provided in the present application. In order to reduce the charging difference between the positive polarity voltage (SIC P) corresponding to ae grayscale and the negative polarity voltage (SIC N) corresponding to the same grayscale, in the related art, the applicant has provided a technical solution which compensates for the charging difference between the positive polarity voltage corresponding to a grayscale and the negative polarity voltage corresponding to the same grayscale by advancing the charging time of the positive polarity voltage or delaying the charging time of the negative polarity voltage. However, this technical solution will cause image crosstalk issues.

Figure 1:
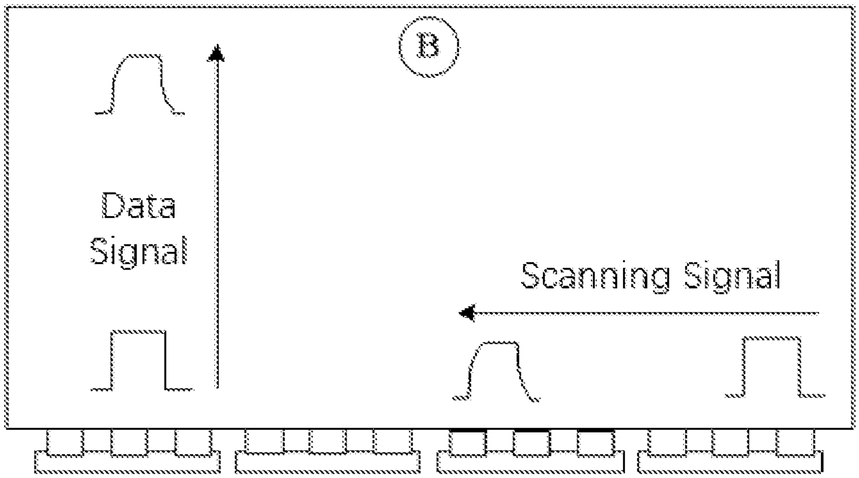
FIG. 1 is a schematic diagram of signal transmission loss in the display device provided in the present application.
Figure 2:
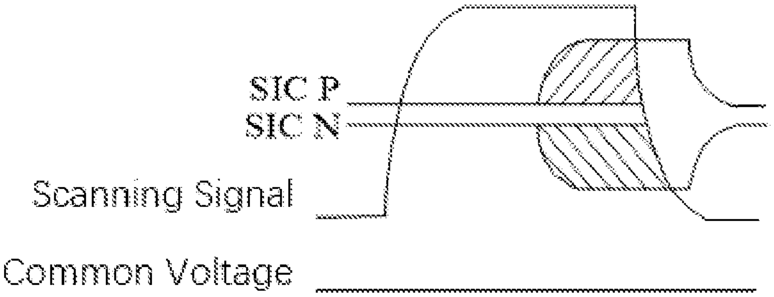
FIG. 2 is a schematic diagram of a first charging rate of sub-pixels provided in the present application.

Specifically, as shown in FIG. 2, when the positive polarity voltage and the negative polarity voltage of the same grayscale are output simultaneously, the positive polarity voltage and negative polarity voltage transition simultaneously. Therefore, the coupling effect of the positive polarity voltage with the in-plane common voltage (COM) and the coupling effect of the negative polarity voltage with the in-plane common voltage (COM) counteract each other, thus preventing changes in the voltage value of the common voltage. However, as shown in FIG. 3, when the positive polarity voltage corresponding to a grayscale and the negative polarity voltage corresponding to the same grayscale are output with staggered timing, the transition time of the positive polarity voltage and the negative polarity voltage are different. The coupling effect of the positive polarity voltage on the common voltage and the coupling effect of the negative polarity voltage on the common voltage cannot counteract each other, resulting in fluctuations in the voltage value of the common voltage, which will cause image crosstalk issues.

Figure 4:
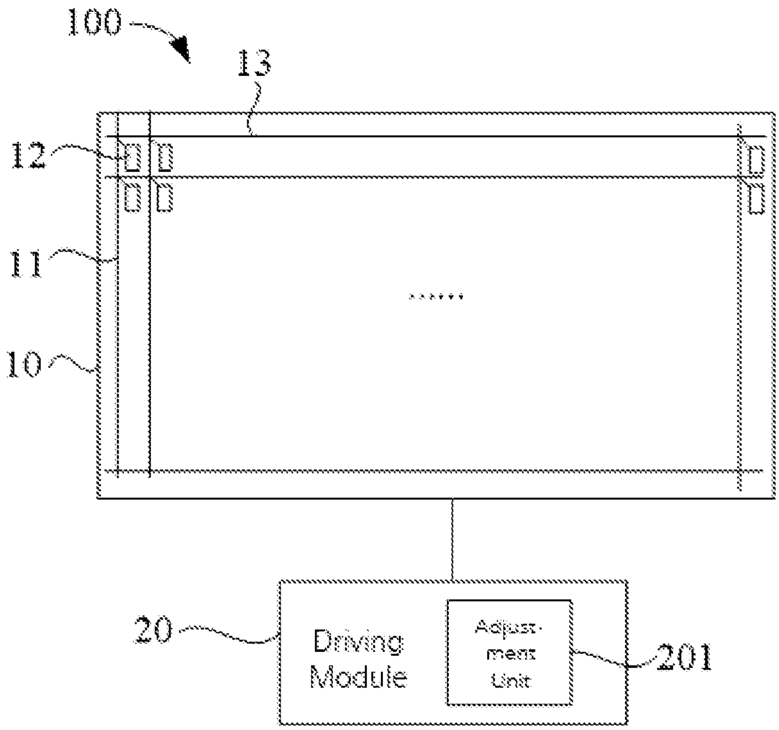
FIG. 4 is a schematic diagram of a first structure of a display device provided in the present application.
Figure 5:
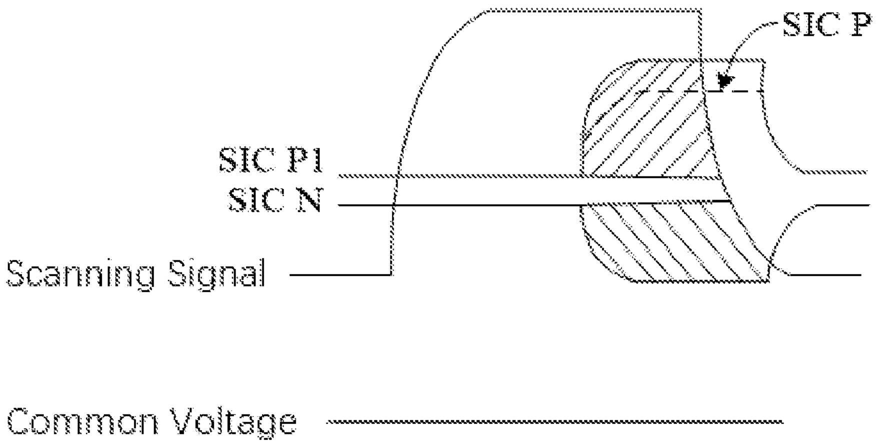
FIG. 5 is a schematic diagram of a third charging rate of sub-pixels provided in the present application.

For this reason, the applicant has proposed a new technical solution. Refer to FIGS. 4 and 5. FIG. 4 is a schematic diagram of a first structure of a display device provided in the present application. FIG. 5 is a schematic diagram of a third charging rate of sub-pixels provided in the present application. In the embodiments of the present application, the display device 100 includes a display panel 10 and a driving module 20.

The display panel 10 includes a plurality of data lines 11 and a plurality of sub-pixels 12 connected to the data lines 11. Within a frame period of an image, each sub-pixel 12 corresponds to a grayscale for display, and each grayscale includes a positive polarity voltage and a negative polarity voltage symmetrical with respect to the common voltage. The data lines 11 are configured to output corresponding data voltages to each sub-pixel respectively 12 within a frame period of an image.

The driving module 20 is connected to the display panel 10. The driving module 20 is configured to output data voltages to the data lines 11. The driving module 20 includes an adjustment unit 201. The adjustment unit 201 is configured to increase the voltage value of the positive polarity voltage to obtain a compensated positive polarity voltage. Wherein, the data voltages are the negative polarity voltages or the compensated positive polarity voltages.

As shown in FIG. 5, the dashed line represents the waveform of the positive polarity voltage. It can be seen that the effective charging time (shaded area) of the positive polarity voltage is less than the effective charging time of the negative polarity voltage. After the voltage value of the positive polarity voltage is increased, the effective charging time of the compensated positive polarity voltage (SIC P1) significantly increases. Ideally, for the same grayscale, if tuned properly, the optimal compensation value for the positive polarity voltage can be found, making the effective charging time of the compensated positive polarity voltage exactly the same as the effective charging time of the negative polarity voltage.

In the embodiments of the present application, the driving module 20 is provided with an adjustment unit 201. The adjustment unit 201 is configured to increase the voltage values of the positive polarity voltages to obtain the compensated positive polarity voltages. The data lines 11 output the corresponding negative polarity voltages or the corresponding compensated positive polarity voltages to each sub-pixel respectively 12 within a frame period of an image. That is, by charging the corresponding sub-pixels 12 with the compensated positive polarity voltages, the charging difference between the positive polarity voltage corresponding to a grayscale and the negative polarity voltage corresponding to the same grayscale can be reduced, thus improving the charging uniformity of the display panel 10. In addition, for the same grayscale, since the negative polarity voltage and the compensated positive polarity voltage are still output simultaneously, the negative polarity voltage and the compensated positive polarity voltage transition at the same time, and their coupling effects on the common voltage counteract each other. This improves the display effect without affecting the common voltage, thereby avoiding display quality issues such as image crosstalk.

It should be noted that in the actual display process of the display panel 10, the adjustment unit 201 does not need to compensate for the positive polarity voltages corresponding to each grayscale. The adjustment unit 201 only needs to compensate for the positive polarity voltages that appear in each frame of the image.

In some embodiments of the present application, the display panel 10 further includes scanning lines 13. Each sub-pixel 12 is connected to the corresponding data line 11 and the corresponding scanning line 13. The sub-pixels 12 display images under the control of the data lines 11 and the scanning lines 13. Wherein, when the display panel 10 display images, the sub-pixels 12 presented in each frame of the image may be red sub-pixels, green sub-pixels, blue sub-pixels, white sub-pixels, yellow sub-pixels, etc. The present application does not make specific limitations on this.

In some embodiments of the present application, the display panel 10 may adopt driving methods such as dot inversion, column inversion, frame inversion, etc., to further improve display problems such as screen flicker. The present application does not make specific limitations on this.

In some embodiments of the present application, each grayscale corresponds to a positive polarity grayscale and a negative polarity grayscale. The positive polarity grayscale corresponds to a positive polarity voltage, and the negative polarity grayscale corresponds to a negative polarity voltage. Wherein, the grayscale value of the positive polarity grayscale and the grayscale value of the negative polarity grayscale are the same, but their polarities are opposite. The positive polarity voltage corresponding to a grayscale and the negative polarity voltage corresponding to the same grayscale are symmetrical with respect to a common voltage. The voltage value of the common voltage can be set according to the actual display effect of the display panel 10.

In some embodiments of the present application, the adjustment unit 201 can perform grayscale increase processing on the positive polarity grayscales corresponding to each grayscale respectively, thereby adjusting the positive polarity voltages to obtain compensated positive polarity voltages. The adjustment unit 201 can also directly perform voltage increase processing on the positive polarity voltages corresponding to each grayscale respectively to obtain compensated positive polarity voltages. The adjustment method of the adjustment unit 201 can be set according to the position of the adjustment unit 201 in the driving module 20, which will be described in the following embodiments.

In some embodiments of the present application, the driving module 20 is also configured to confirm the increase value of the positive polarity voltage corresponding to the grayscale based on the monochrome image of the grayscale. It can be understood that each monochrome image has its own display characteristics. The driving module 20 can confirm the increase value of the positive polarity voltage corresponding to the grayscale based on the corresponding display characteristics.

Wherein, the monochrome image of the grayscale refers to all sub-pixels 12 in a frame of image being driven under a same grayscale, and the display characteristics refer to the brightness of the display image, the charging differences at various positions, and so on.

It can be understood that if the image display data input to the display panel is 8-bit binary, it would generate 2^8 original grayscales of brightness from darkest to brightest. That is, it would generate 256 grayscales of different brightness (for instance, from the 0th grayscale to the 255th grayscale). The 0th grayscale is the lowest, and the 255th grayscale is the highest. For different grayscales, the charging difference between the positive polarity voltages and the negative polarity voltages may vary. Therefore, initially, the required increase for the positive polarity voltages corresponding to different grayscales can be confirmed by measuring each grayscale's monochrome image.

Alternatively, in some embodiments of the present application, the increase values of the positive polarity voltages corresponding to some grayscales can also be confirmed by measuring the monochrome images of some grayscales. Then, the increase values of the positive polarity voltages corresponding to other grayscales are obtained by interpolation and other processing methods.

For example, in some embodiments, the grayscales include a first grayscale and a second grayscale, where the first grayscale is greater than the second grayscale, and the increase value of the positive polarity voltage corresponding to the first grayscale is greater than the increase value of the positive polarity voltage corresponding to the second grayscale.

It can be understood that the larger the grayscale, the larger the voltage values of the corresponding positive polarity voltage and the corresponding negative polarity voltage. As shown in FIG. 5, under the driving of the same scanning signal, the larger the voltage value, the greater the charging difference (difference in shaded area) between the positive polarity voltage and the negative polarity voltage. Therefore in the embodiments of this application, when the first grayscale is greater than the second grayscale, by setting the increase value of the positive polarity voltage corresponding to the first grayscale greater than the increase value of the positive polarity voltage corresponding to the second grayscale, the charging difference between the positive polarity voltage and the negative polarity voltage both corresponding to the high grayscale can be effectively reduced, thus further improving the display uniformity of the display panel 10.

In addition, according to the law in the present embodiment, the increase values of the positive polarity voltages corresponding to other grayscales can be obtained based on the increase values of the positive polarity voltages required for some grayscales, thereby simplifying the initial measurement process.

It should be noted that, in the embodiments of the present application, the increase value of the positive polarity voltage corresponding to the grayscale can either be a voltage increase value or a grayscale increase value. It can be understood that since the voltages corresponds to the grayscales one by one, increasing the grayscale values can also achieve the technical effect of increasing the voltage values.

In some embodiments of the present application, the driving module 20 can also include a register (not shown in the figure). The register is configured to store the increase values of the positive polarity grayscales corresponding to each grayscale respectively. Alternatively, the driving module 20 can set or adjust the increase values of the positive polarity voltages corresponding to each grayscale respectively through the register. Specifically, the increase values of the positive polarity voltages can be set through the register according to the charging difference between the positive polarity voltages and the negative polarity voltages of the display panel. Then, by observing the display effect of the display panel or directly measuring the charging waveform, the increase values of the positive polarity voltages stored in the register are adjusted until the charging differences between the positive polarity voltages and the negative polarity voltages meet the preset conditions.

After the increase values of the positive polarity voltages corresponding to each grayscale respectively are recorded, the increase values of the positive polarity voltages corresponding to each grayscale respectively can be applied in complex display images. That is, for different display images, the positive polarity voltages of different grayscales can be compensated accordingly according to the increase values of the positive polarity grayscales corresponding to each grayscale respectively stored in the register.

In some embodiments of the present application, for the same grayscale, the compensated positive polarity voltage corresponding to a sub-pixel 12 closer to the driving module 20 is greater than the compensated positive polarity voltage corresponding to a sub-pixel 12 farther from the driving module 20.

It can be understood that the data voltages are transmitted from the driving module 20 to the display panel 10. Due to RC delay, the waveform of the data signal transmitted by the same data line 11 distorts due to losses. The farther away from the driving module 20, the more severe the distortion of the data signal and the worse the charging effect. Therefore, for the same grayscale, by making the compensated positive polarity voltage corresponding to the sub-pixel 12 closer to the driving module 20 greater than the compensated positive polarity voltage corresponding to the sub-pixel 12 farther from the driving module 20, the difference in charging effects at different locations on the display panel 10 can be further reduced, thereby improving the display effect.

Figures 6, 7:
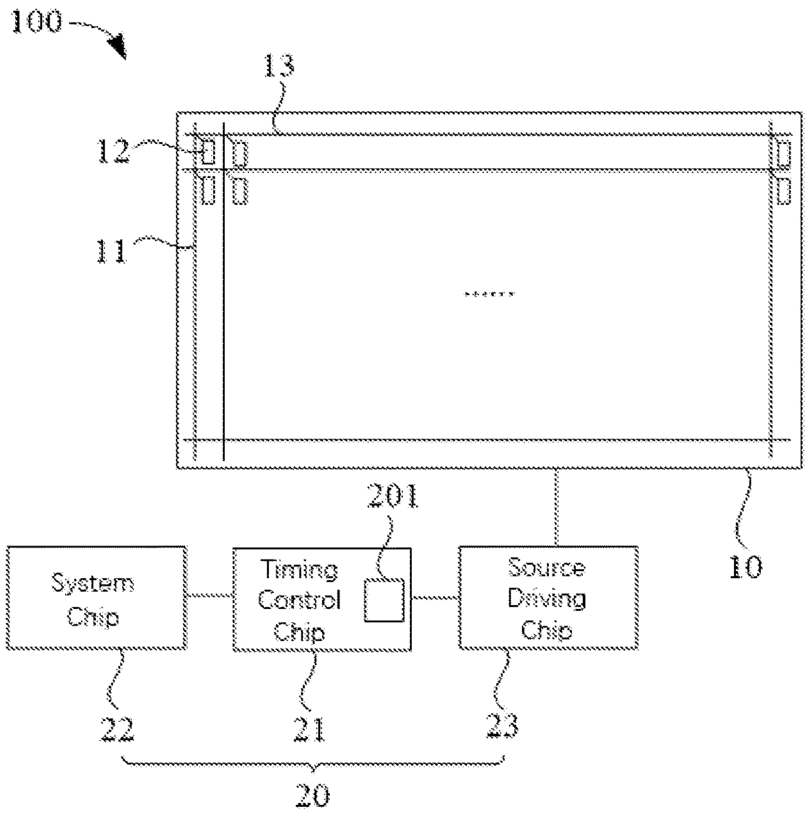
FIG. 6 is a schematic diagram of a second structure of a display device provided in the present application.
FIG. 7 is a schematic diagram of data voltages transmitted by the data lines in a plurality of frames of images provided in the present application.

Refer to FIG. 6, FIG. 6 is a schematic diagram of a second structure of a display device provided in the present application. The difference between the display device 100 shown in FIG. 6 and the display device 100 shown in FIG. 4 is that, in the embodiments of the present application, the driving module 20 includes a timing control chip 21. The adjustment unit 201 is integrated in the timing control chip 21. The adjustment unit 201 is configured to increase the grayscale values of the positive polarity grayscales in each frame of the image.

The driving module 20 further includes a system chip 22 and a source driving chip 23. The system chip 22 is configured to provide image data to the timing control chip 21. The image data includes data from a plurality of frames of the images. The data for each frame of the image include the grayscales corresponding to each sub-pixel respectively in a frame of image. The timing control chip 21 is configured to process the image data and transmit the image data to the source driving chip 23. The source driving chip 23 is configured to output data voltages to the data lines 11.

Figure 8:
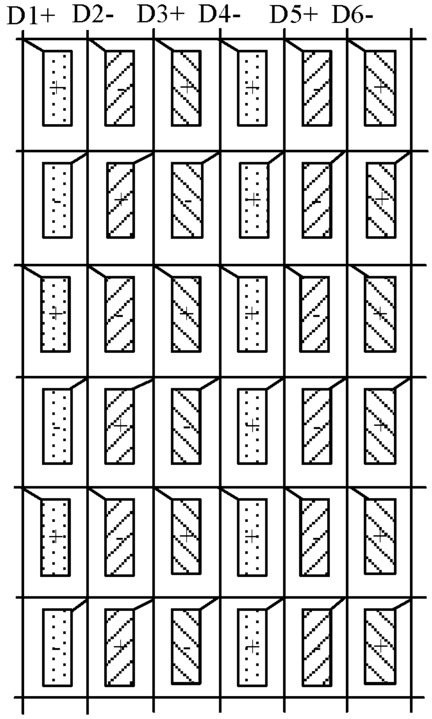
FIG. 8 is a schematic diagram of a pixel arrangement of a display panel provided in the present application.

Specifically, refer to FIG. 7 and FIG. 8. FIG. 7 is a schematic diagram of data voltages transmitted by the data lines in a plurality of frames of images provided in the present application. FIG. 8 is a schematic diagram of a pixel arrangement of a display panel provided in the present application.

As shown in FIG. 7, the embodiments of the present application are explained by the example of the display panel 10 displaying a monochrome image of 10 frames at grayscale 32, but this explanation should not be understood as a limitation on the scope of protection of the present application. The "+" and "−" symbols represent positive polarity and negative polarity, respectively. It can be seen from the figure that the positive polarity grayscales corresponding to grayscale 32 increases by 2 grayscales to grayscale 34. The negative polarity grayscales corresponding to grayscale 32 remains unchanged at grayscale −32. The grayscales of different frames change cyclically while maintaining the positive polarity grayscales at a higher grayscale output, thereby effectively compensating for the insufficient charging of the positive polarity voltages corresponding to the same grayscale.

Specifically, within a frame period of an image, the polarities of the data voltages transmitted by two adjacent data lines 11 are opposite, and the polarities of the data voltages corresponding to two adjacent sub-pixels 12 are opposite. That is, the display panel adopts a driving architecture with column inversion paired with flip pixels. For example, the first data line D1 transmits a positive polarity data voltage, the second data line D2 transmits a negative polarity data voltage, the third data line D3 transmits a positive polarity data voltage, the fourth data line D4 transmits a negative polarity data voltage, the fifth data line D5 transmits a positive polarity data voltage, and the sixth data line D6 transmits a negative polarity data voltage.

Furthermore, within frame periods of two adjacent images, the polarities of the data voltages transmitted by the same data line 11 are opposite. For example, in the first frame, the first data line D1 transmits a positive polarity data voltage; in the second frame, the first data line D1 transmits a negative polarity data voltage; and so on.

In the embodiments of the present application, although the timing control chip 21 does not know which data line 11 is transmitting positive polarity data voltages and which data line 11 is transmitting negative polarity data voltages, the source driving chip 23 outputs positive polarity data voltages and negative polarity data voltages under the control of the timing control chip 21. Therefore, the timing control chip 21 can realize the function of the adjusting unit 201 by presetting in advance.

Specifically, in some embodiments of the present application, the timing control chip 21 is also configured to set the polarity of the data voltages transmitted by each data line 11 respectively in the first frame of image. That is, the initial state of the source driving chip 23 can be set by the timing control chip 21. For example, in the first frame, the first data line D1 transmits a positive polarity data voltage and the second data line D2 transmits a negative polarity data voltage; in the second frame, the first data line D1 transmits a negative polarity data voltage and the second data line D2 transmits a positive polarity data voltage; and so on; in the (2n−1)th frame, the first data line D1 transmits a positive polarity data voltage and the second data line D2 transmits a negative polarity data voltage; in the 2nth frame, the first data line D1 transmits a negative polarity data voltage and the second data line D2 transmits a positive polarity data voltage. Wherein, n is an integer greater than or equal to 2.

Figure 9:
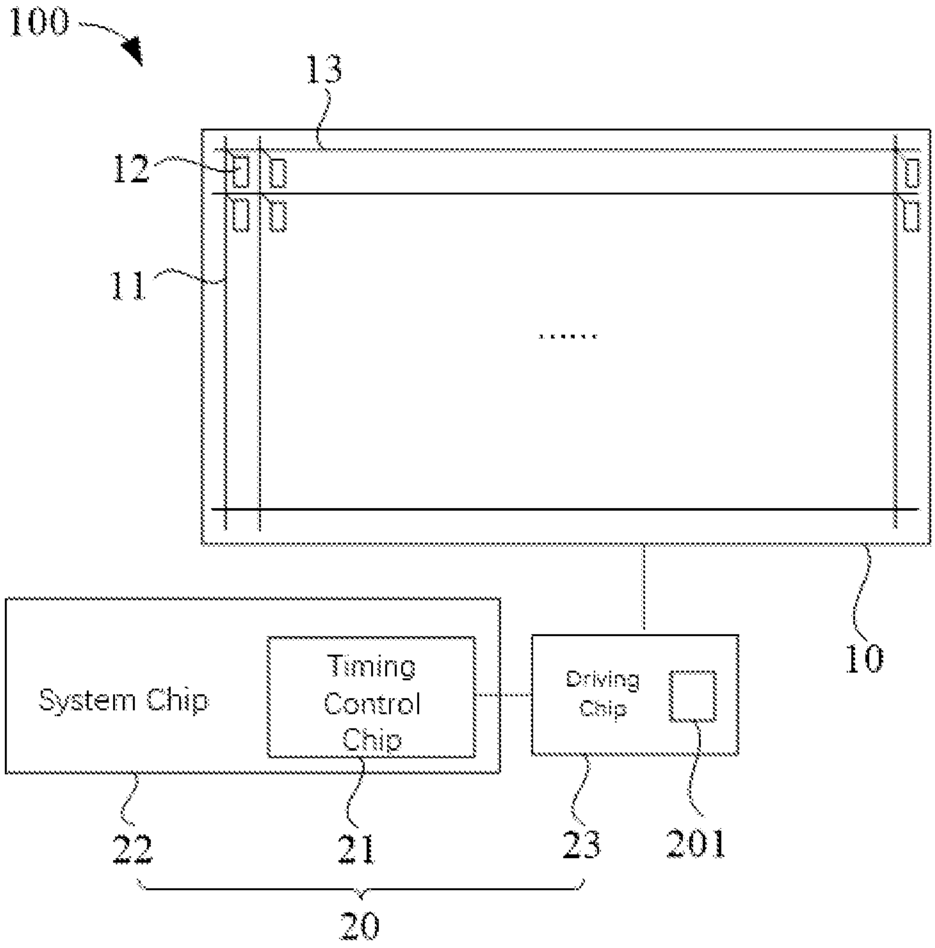
FIG. 9 is a schematic diagram of a third structure of a display device provided in the present application.

Refer to FIG. 9. FIG. 9 is a schematic diagram of a third structure of a display device provided in the present application. The difference between the display device 100 shown in FIG. 9 and that shown in FIG. 6 is that in the embodiments of the present application, the timing control chip 21 is integrated in the system chip 22, and the adjustment unit 201 is integrated in the source driving chip 23.

In the embodiments of the present application, the timing control chip 21 is integrated in the system chip 22, that is, the embodiments of the present application adopt an architecture without a separate timing control chip 21, thus saving costs.

Figure 10:
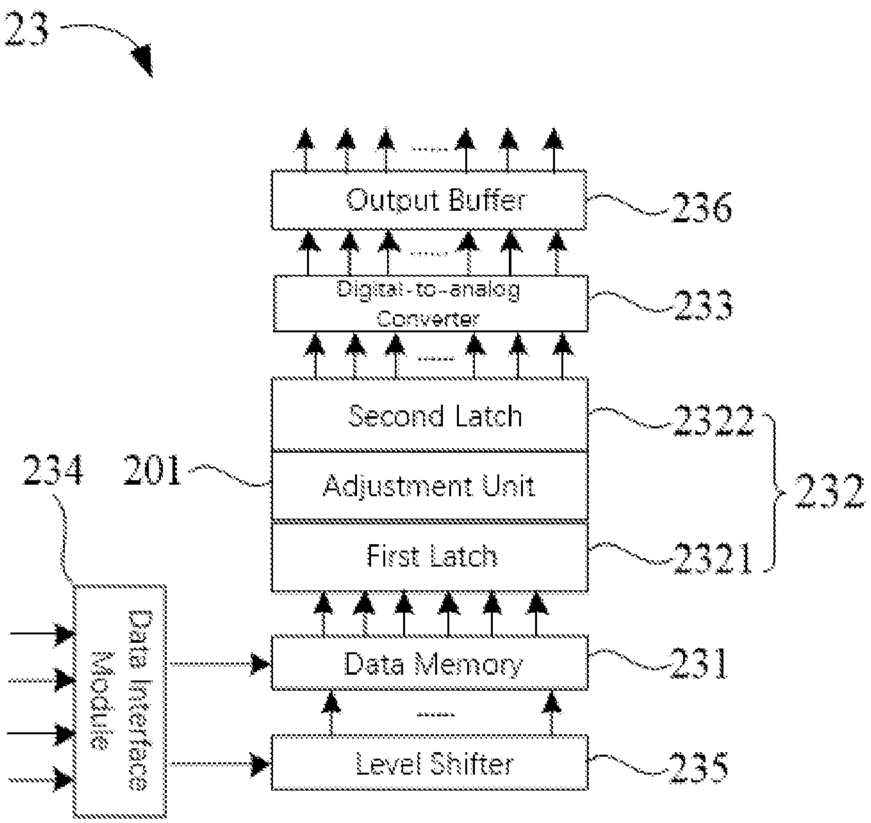
FIG. 10 is a schematic diagram of a first structure of a source driving chip provided in the present application.

Refer to FIG. 10. FIG. 10 is a schematic diagram of a first structure of a source driving chip provided in the present application. In the embodiments of the present application, the source driving chip 23 includes a data memory 231, a latch 232 and a digital-to-analog converter 233 arranged in sequence. The data memory 231, latch 232 and digital-to-analog converter 233 are circuits familiar to those skilled in the art and will not be repeated here.

The adjustment unit 201 is disposed between the data memory 231 and the digital-to-analog converter 233. The adjustment unit 201 is configured to adjust the voltage values of the positive polarity voltages corresponding to a row of sub-pixels 12 each time.

It can be understood that in the source driving chip 23 provided in the embodiments of the present application, the latch 232 latches and transmits the data voltages corresponding to a row of sub-pixels 12 each time. Therefore, the adjustment unit 201 is configured to adjust the voltage values of the positive polarity voltages corresponding to a row of sub-pixels 12 each time.

Specifically, when the adjustment unit 201 is disposed between the data memory 231 and the digital-to-analog converter 233, the adjustment unit 201 is configured to increase the grayscale values of the positive polarity voltages corresponding to a row of sub-pixels 12, thereby adjusting the positive polarity voltages.

The source driving chip 23 further includes a data interface module 234, a level shifter 235, and an output buffer 236. The level shifter 235 is disposed between the data interface module 234 and the data memory 231. The output buffer 236 is disposed after the digital-to-analog converter 233. The data interface module 234 is configured to receive the display data and clock signals transmitted from the timing control chip 21, transmit the display data to the data memory 231, and transmit the clock signals to the level shifter 235. After the digital-to-analog converter 233 converts the digital signals into data voltages (analog signals), the output buffer 236 is configured to enhance the driving capability of the data voltages and output the data voltages to the data lines 11 in the display panel 10.

In the embodiments of the present application, the latch 232 includes a first latch 2321 and a second latch 2322. The second latch 2322 is disposed between the first latch 2321 and the digital-to-analog converter 233, and the second latch 2322 is configured to latch the data voltages corresponding to the present row of sub-pixels 12. The first latch 2321 is configured to latch the data voltages corresponding to the next row of sub-pixels 12. The adjustment unit 201 is disposed between the first latch 2321 and the second latch 2322.

Figure 11:
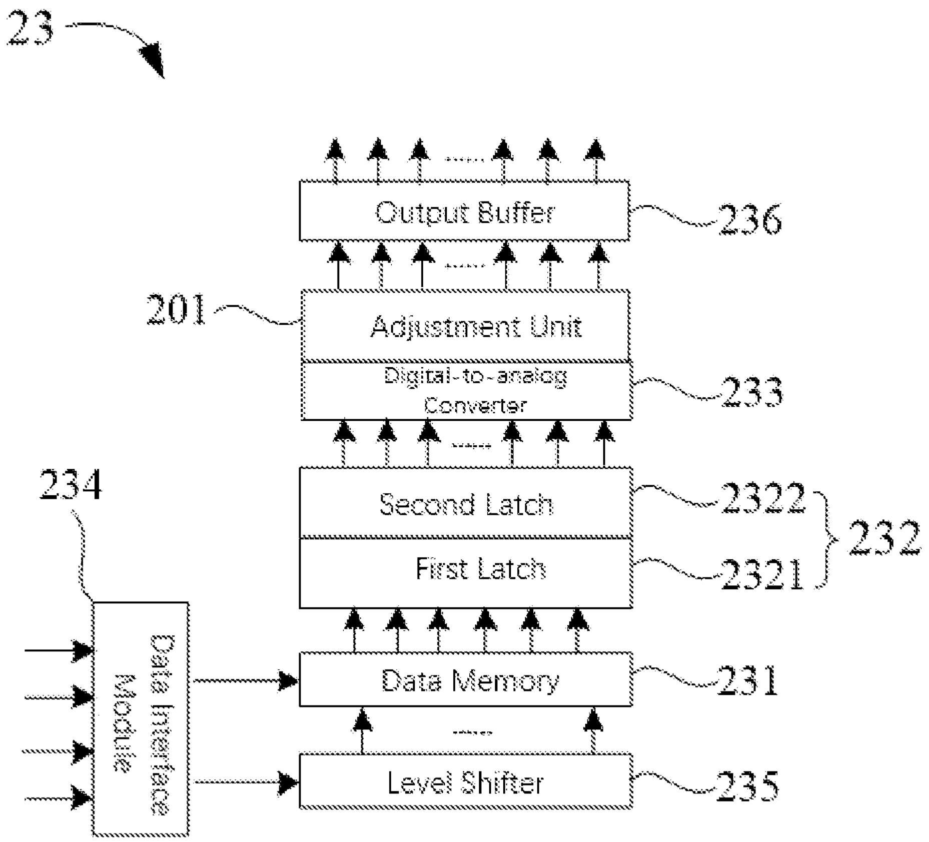
FIG. 11 is a schematic diagram of a second structure of a source driving chip provided in the present application.

Refer to FIG. 11. FIG. 11 is a schematic diagram of a second structure of a source driving chip provided in the present application. The difference between the source driving chip 23 shown in FIG. 11 and the source driving chip 23 shown in FIG. 10 is that, in the embodiments of the present application, the adjustment unit 201 is disposed after the digital-to-analog converter 233. Specifically, the adjustment unit 201 is disposed between the digital-to-analog converter 233 and the output buffer 236.

In the embodiments of the present application, since the digital-to-analog converter 233 converts digital signals into data voltages (analog signals), the adjustment unit 201 directly performs voltage increase processing on the positive polarity voltages corresponding to a row of sub-pixels 12. Specifically, the adjustment unit 201 can still invoke the grayscale increase values of the positive polarity voltages corresponding to each grayscale respectively stored in the register, and then perform voltage increase processing on the positive polarity voltages corresponding to each grayscale respectively.

In the display device 100 provided in the present application, the driving module 20 is provided with an adjustment unit 201. The adjustment unit 201 obtains the compensated positive polarity voltages by increasing the voltage values of the positive polarity voltages. Within a frame period of an image, the data line 11 outputs corresponding negative polarity voltages or compensated positive polarity voltages to each sub-pixel 12 respectively. Therefore, by charging the corresponding sub-pixels 12 with the compensated positive polarity voltages, the charging difference between the positive polarity voltage corresponding to a grayscale and the negative polarity voltage corresponding to the same grayscale can be reduced. Furthermore, it can avoid picture quality issues such as crosstalk while ensuring uniform charging of the display panel 10.

The above provides a detailed introduction to the display device provided in the embodiments of the present application. Specific examples are used herein to illustrate the principles and implementation methods of the present application. The above embodiments are only intended to help understand the implementation methods and core idea of the present application. Those skilled in the art can make corresponding changes to the technical solutions of the present application based on the ideas of the present application. In summary, the content of this specification should not be understood as limitation to the present application.

What is claimed is:

1. A display device, comprising:

a display panel, wherein the display panel comprises a plurality of data lines and a plurality of sub-pixels, and each of the data lines is connected to ones of the sub-pixels; and within a frame period of image, each of the sub-pixels is configured to display according to a grayscale corresponding to a positive polarity voltage and a negative polarity voltage symmetrical with respect to a common voltage, and the each of the data lines is configured to transmit a data voltage to each of the ones of the sub-pixels; and a driving module connected to the display panel, wherein the driving module is configured to output the data voltage to the each of the data lines and comprises an adjustment unit configured to increase a voltage value of the positive polarity voltage to obtain a compensated positive polarity voltage, wherein the data voltage comprises the negative polarity voltage and the compensated positive polarity voltage which are simultaneously output for the grayscale;

the driving module comprises a system chip, a timing control chip and a source driving chip, the timing control chip is integrated in the system chip, and the adjustment unit is integrated in the source driving chip;

the source driving chip comprises a data memory, a latch and a digital-to-analog converter arranged in sequence; and the adjustment unit is disposed between the data memory and the digital-to-analog converter or after the digital-to-analog converter, and the adjustment unit is configured to adjust the positive polarity voltage corresponding to each of ones of the sub-pixels arranged in a row each time.

2. The display device according to claim 1, wherein the grayscale comprises a positive polarity grayscale corresponding to the positive polarity voltage and a negative polarity grayscale corresponding to the negative polarity voltage, and the adjustment unit is configured to increase a grayscale value of the positive polarity grayscale.

3. The display device according to claim 1, wherein the timing control chip is further configured to set a polarity of the data voltage transmitted by each of the data lines in a first frame of image.

4. The display device according to claim 1, wherein the latch comprises a first latch and a second latch disposed between the first latch and the digital-to-analog converter, the second latch is configured to latch the data voltage corresponding to each of ones of the sub-pixels arranged in a current row, and the first latch is configured to latch the data voltage corresponding to each of ones of the sub-pixels arranged in a next row;

wherein the adjustment unit is disposed between the first latch and the second latch.

5. The display device according to claim 1, wherein, within a same frame period of image, a polarity of the data voltage transmitted by one of every two adjacent ones of the data lines is opposite to a polarity of the data voltage transmitted by another of the every two adjacent ones of the data lines; and wherein the sub-pixels are arranged in an array, and within the same frame period of image, a polarity of the data voltage corresponding to one of every two adjacent ones of the sub-pixels is opposite to a polarity of the data voltage corresponding to another of the every two adjacent ones of the sub-pixels, or a polarity of the data voltage corresponding to each of ones of the sub-pixels arranged in one of every adjacent two columns is opposite to a polarity of the data voltage corresponding to each of ones of the sub-pixels arranged in another of the every adjacent two columns.

6. The display device according to claim 5, wherein a polarity of the data voltage transmitted by one of the data lines within one of two adjacent frame periods of image is opposite to a polarity of the data voltage transmitted by the one of the data lines within another of the two adjacent frame periods of image.

7. The display device according to claim 1, wherein the driving module is further configured to determine, based on a monochrome image of the grayscale, an increase value of the positive polarity voltage corresponding to the grayscale; and the driving module further comprises a register configured to store the increase value of the positive polarity voltage corresponding to the grayscale.

8. The display device according to claim 1, wherein the grayscales comprise a first grayscale and a second grayscale, the first grayscale is greater than the second grayscale, and the increase value of the positive polarity voltage corresponding to the first grayscale is greater than the increase value of the positive polarity voltage corresponding to the second grayscale.

9. The display device according to claim 1, wherein for a same grayscale, the compensated positive polarity voltage corresponding to one of the sub-pixels close to the driving module is greater than the compensated positive polarity voltage corresponding to one of the sub-pixels away from the driving module.

10. A display device, comprising:

a display panel, wherein the display panel comprises a plurality of data lines and a plurality of sub-pixels, and each of the data lines is connected to ones of the sub-pixels; and within a frame period of image, each of the sub-pixels is configured to display according to a grayscale corresponding to a positive polarity voltage and a negative polarity voltage symmetrical with respect to a common voltage, and the each of the data lines is configured to transmit a data voltage to each of the ones of the sub-pixels; and a driving module connected to the display panel and configured to output the data voltage to the each of the data lines, wherein the driving module comprises an adjustment unit, a system chip, a timing control chip and a source driving chip, the timing control chip is integrated in the system chip, and the adjustment unit is integrated in the source driving chip, wherein the adjustment unit is configured to determine, based on a monochrome image of the grayscale, an increase value of the positive polarity voltage corresponding to the grayscale to obtain a compensated positive polarity voltage; and the data voltage comprises the negative polarity voltage and the compensated positive polarity voltage which are simultaneously output for the grayscale;

the source driving chip comprises a data memory, a latch and a digital-to-analog converter arranged in sequence; and the adjustment unit is disposed between the data memory and the digital-to-analog converter or after the digital-to-analog converter, and the adjustment unit is configured to adjust the positive polarity voltage corresponding to each of ones of the sub-pixels arranged in a row each time.

11. The display device according to claim 10, wherein the latch comprises a first latch and a second latch disposed between the first latch and the digital-to-analog converter, the second latch is configured to latch the data voltage corresponding to each of ones of the sub-pixels arranged in a current row, and the first latch is configured to latch the data voltage corresponding to each of ones of the sub-pixels arranged in a next row;

wherein the adjustment unit is disposed between the first latch and the second latch.

12. The display device according to claim 10, wherein the grayscales comprise a first grayscale and a second grayscale, the first grayscale is greater than the second grayscale, and the increase value of the positive polarity voltage corresponding to the first grayscale is greater than the increase value of the positive polarity voltage corresponding to the second grayscale.

13. The display device according to claim 10, wherein for a same grayscale, the compensated positive polarity voltage corresponding to one of the sub-pixels close to the driving module is greater than the compensated positive polarity voltage corresponding to one of the sub-pixels away from the driving module.

14. The display device according to claim 10, wherein the grayscale comprises a positive polarity grayscale corresponding to the positive polarity voltage and a negative polarity grayscale corresponding to the negative polarity voltage, and the adjustment unit is configured to increase a grayscale value of the positive polarity grayscale.

15. The display device according to claim 10, wherein the timing control chip is further configured to set a polarity of the data voltage transmitted by each of the data lines in a first frame of image.

16. The display device according to claim 10, wherein, within a same frame period of image, a polarity of the data voltage transmitted by one of every two adjacent ones of the data lines is opposite to a polarity of the data voltage transmitted by another of the every two adjacent ones of the data lines; and the sub-pixels are arranged in an array, and within the same frame period of image, a polarity of the data voltage corresponding to one of every two adjacent ones of the sub-pixels is opposite to a polarity of the data voltage corresponding to another of the every two adjacent ones of the sub-pixels, or a polarity of the data voltage corresponding to each of ones of the sub-pixels arranged in one of every adjacent two columns is opposite to a polarity of the data voltage corresponding to each of ones of the sub-pixels arranged in another of the every adjacent two columns.

17. The display device according to claim 16, wherein a polarity of the data voltage transmitted by one of the data lines within one of two adjacent frame periods of image is opposite to a polarity of the data voltage transmitted by the one of the data lines within another of the two adjacent frame periods of image.

* * * * *